(12) United States Patent
Werkheiser et al.

(10) Patent No.: US 10,125,603 B2
(45) Date of Patent: Nov. 13, 2018

(54) FREQUENCY SWEEPS FOR ENCODING DIGITAL SIGNALS IN DOWNHOLE ENVIRONMENTS

(71) Applicant: HALLIBURTON ENERGY SERVICES, INC., Houston, TX (US)

(72) Inventors: Gregory Thomas Werkheiser, Carrollton, TX (US); Michael Linley Fripp, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 11 days.

(21) Appl. No.: 15/536,098

(22) PCT Filed: Feb. 26, 2015

(86) PCT No.: PCT/US2015/017793
§ 371 (c)(1),
(2) Date: Jun. 14, 2017

(87) PCT Pub. No.: WO2016/137473
PCT Pub. Date: Sep. 1, 2016

(65) Prior Publication Data
US 2017/0350238 A1    Dec. 7, 2017

(51) Int. Cl.
*E21B 47/12* (2012.01)
*H04Q 9/00* (2006.01)

(52) U.S. Cl.
CPC .............. *E21B 47/12* (2013.01); *H04Q 9/00* (2013.01)

(58) Field of Classification Search
CPC .................................. E21B 47/12; H04Q 9/00
See application file for complete search history.

(56) References Cited

U.S. PATENT DOCUMENTS

| 4,415,895 A | 11/1983 | Flagg |
| 6,313,755 B1 | 11/2001 | Hetmaniak et al. |
| 9,771,792 B2 * | 9/2017 | Xu ........................ E21B 47/122 |
| 2007/0195644 A1 * | 8/2007 | Marples ................. G01V 1/005 367/39 |
| 2010/0195442 A1 | 8/2010 | Reyes et al. |

(Continued)

FOREIGN PATENT DOCUMENTS

WO    2014/085936    6/2014

OTHER PUBLICATIONS

PCT International Search Report and Written Opinion, dated Oct. 30, 2015, Appl. No. PCT/US2015/017793, "Frequency Sweeps for Encoding Digital Signals in Downhole Environments," filed Feb. 26, 2015.

(Continued)

*Primary Examiner* — Sisay Yacob
(74) *Attorney, Agent, or Firm* — John W. Wustenberg; Parker Justiss, P.C.

(57) ABSTRACT

A method for encoding signals using frequency sweeps in a downhole environment, in some embodiments, comprises: obtaining a digital signal; encoding the digital signal using one or more frequency sweeps to produce an encoded signal; transmitting the encoded signal from a transmitter to a receiver, at least one of the transmitter or receiver disposed downhole; receiving the encoded signal at the receiver; and decoding the encoded signal at the receiver to produce a decoded digital signal.

20 Claims, 7 Drawing Sheets

(56) References Cited

U.S. PATENT DOCUMENTS

2015/0315905 A1\* 11/2015 Xu ........................ E21B 47/122
 340/854.6

OTHER PUBLICATIONS

Fripp, Deborah R., "Techniques for Studying Vocal Learning in Bottlenose Dolphins, Tursiops truncatus," Submitted to the Department of Biological Oceanography, MIT and WHOI, Feb. 1999, 348 pgs.

\* cited by examiner

FREQUENCY SWEEPS FOR ENCODING DIGITAL SIGNALS IN DOWNHOLE ENVIRONMENTS

BACKGROUND

Traditional downhole telemetry systems typically use communication techniques such as mud pulse telemetry, fiber optics, electromagnetic telemetry and wireless acoustic telemetry, among others. Some such techniques entail the identification of a carrier frequency that is used to transmit data from a transmitter to a receiver. Identifying a reliable carrier frequency, however, can be challenging because the properties of the downhole transmission medium between the transmitter and receiver frequently change (due to friction between tubing and casing and fluctuations in pressure and temperature, for example). As these properties change, a previously reliable carrier frequency may no longer be suitable, and a new carrier frequency must be identified—an unacceptably time-consuming and laborious process that must be frequently repeated.

BRIEF DESCRIPTION OF THE DRAWINGS

Accordingly, there are disclosed in the drawings and in the following description methods and systems for encoding digital signals in downhole environments using frequency sweeps. In the drawings.

Figure 1:
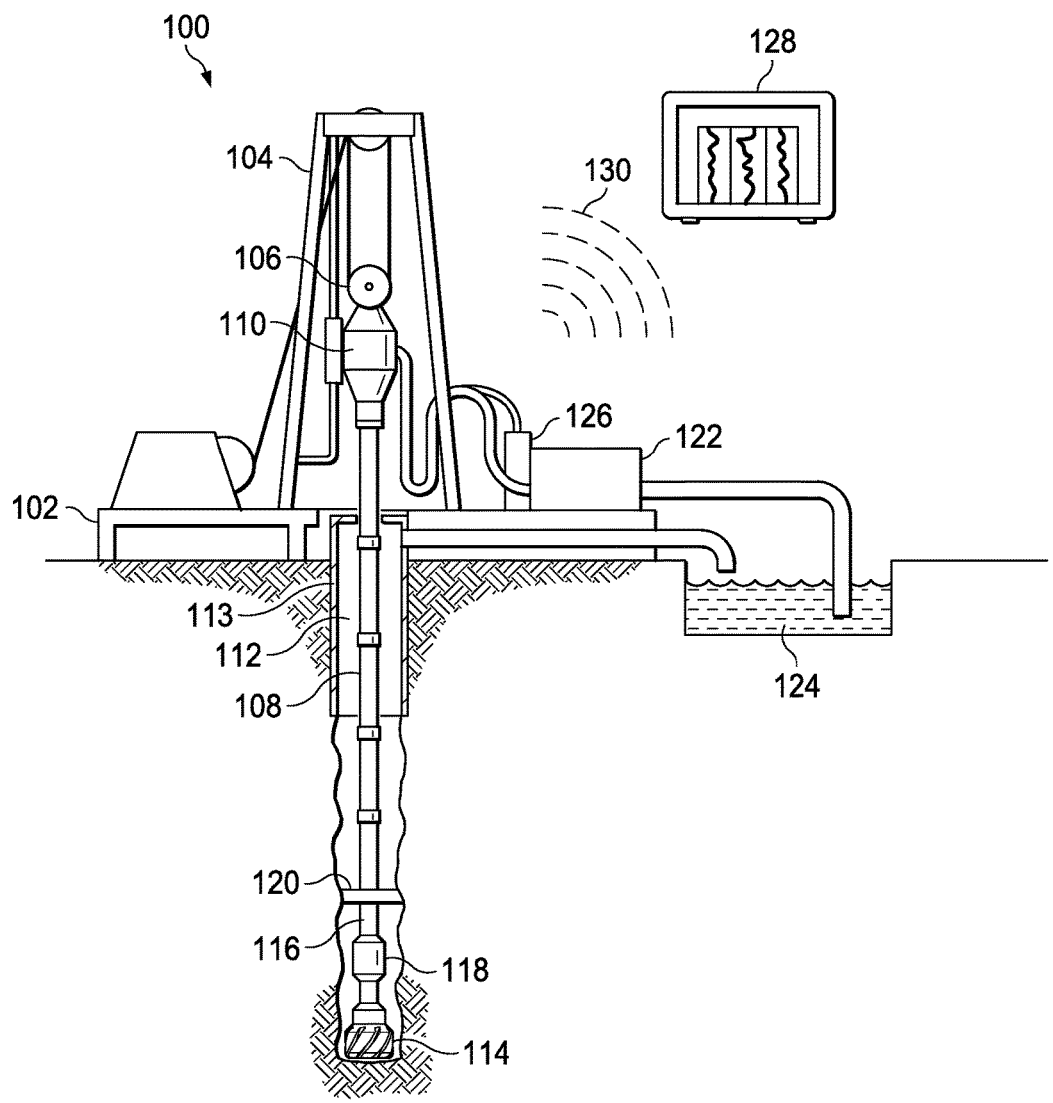
FIG. 1 is a schematic diagram of an illustrative drilling environment.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein are techniques for encoding and transmitting digital signals in a downhole environment using frequency sweeps. A frequency sweep is a signal that transitions from a starting frequency to an ending frequency and that, in preferred embodiments, includes several other frequencies. Each frequency sweep has a number of parameters, including the direction of the sweep (i.e., an upsweep, in which the frequency sweep transitions from a lower starting frequency to a higher ending frequency, or a downsweep, in which the frequency sweep transitions from a higher starting frequency to a lower ending frequency); the range of the sweep (i.e., specific starting and ending frequencies, or specific minimum and maximum frequencies); the speed at which the sweep is performed (i.e., the amount of time required to transition from the starting frequency to the ending frequency, or the amount of time required to transition between the minimum and maximum frequencies); and the differential of the sweep (e.g., the difference between the starting and ending frequencies of a single sweep, or the difference between the minimum and maximum frequencies used in a single sweep).

One or more such frequency sweep parameters are used to encode different digital values, and, in at least some embodiments, this mapping is known to both the transmitter and receiver. Thus, for example, in a binary encoding scheme, a "0" may be encoded using an upsweep and a "1" may be encoded using a downsweep. In this example, the parameter of interest is the direction of the sweep. The range of the sweep also may be used to encode a digital signal. For example, considering starting and ending frequencies only, a sweep from 1000 Hz to 1100 Hz to 1050 Hz encodes a "0," a sweep from 1000 Hz to 1300 Hz to 1050 Hz also encodes a "0," and a sweep from 1000 Hz to 1200 Hz to 1100 Hz encodes a "1." Considering minimum and maximum frequencies only, a sweep from 1000 Hz to 1100 Hz to 1050 Hz encodes a "0," a sweep from 1000 Hz to 1100 Hz to 1075 Hz encodes a "0," and a sweep from 1000 Hz to 1300 Hz to 1050 Hz encodes a "1." Speed is also used to encode digital signals; for instance, a slower sweep and a faster sweep from 1000 Hz to 1100 Hz may be used to encode a "0" and a "1," respectively.

As explained above, sweep differentials may be determined and used in multiple ways. In some embodiments, the sweep differential determination takes into account the starting and ending frequencies of the sweeps. For example, a sweep from 1000 Hz to another frequency and back to 1000 Hz results in a starting and ending frequency differential of zero, which may be used to encode a "0." The same digital value of "0" may be encoded using a sweep from, e.g., 1300 Hz to another frequency and back to 1300 Hz. In some embodiments, the sweep differential determination takes into account the minimum and maximum frequencies of the sweeps. For instance, a sweep from 1000 Hz to 1100 Hz to 1050 Hz results in a differential of 100 Hz, which may be used to encode a "0," and a sweep from 1200 Hz to 1300 Hz to 1250 Hz also results in a differential of 100 Hz and thus also encodes a "0."

The foregoing descriptions and examples are merely illustrative and without limitation. Any and all variations of these embodiments are contemplated and included within the scope of the disclosure. These frequency sweeping techniques are now described in detail with respect to the figures.

FIG. 1 is a schematic diagram of an illustrative drilling environment. The drilling environment 100 comprises a drilling platform 102 that supports a derrick 104 having a traveling block 106 for raising and lowering a drill string 108. A top-drive motor 110 supports and turns the drill string 108 as it is lowered into a borehole 112. The drill string's rotation, alone or in combination with the operation of a downhole motor, drives the drill bit 114 to extend the borehole 112. The drill bit 114 is one component of a bottomhole assembly (BHA) 116 that may further include a rotary steering system (RSS) 118 and stabilizer 120 (or some other form of steering assembly) along with drill collars and logging instruments. A pump 122 circulates drilling fluid through a feed pipe to the top drive 110, downhole through the interior of drill string 108, through orifices in the drill bit 114, back to the surface via an annulus around the drill string 108, and into a retention pit 124. The drilling fluid transports formation samples—i.e., drill cuttings—from the borehole 112 into the retention pit 124 and aids in maintaining the integrity of the borehole. Formation samples may be extracted from the drilling fluid at any suitable time and location, such as from the retention pit 124. The formation samples may then be analyzed at a suitable surface-level laboratory or other facility (not specifically shown). While drilling, an upper portion of the borehole 112 may be stabilized with a casing string 113 while a lower portion of the borehole 112 remains open (uncased).

The drill collars in the BHA 116 are typically thick-walled steel pipe sections that provide weight and rigidity for the drilling process. The thick walls are also convenient sites for installing transmitters and receivers and logging instruments that measure downhole conditions, various drilling parameters, and characteristics of the formations penetrated by the borehole. The transmitters and receivers described below also may be disposed within other portions of the borehole 108 closer to the surface. Transmitters/receivers disposed in any portion of the drill string or at the surface may communicate with any other transmitter or receiver disposed in the drill string or at the surface. The BHA 116 typically further includes a navigation tool having instruments for measuring tool orientation (e.g., multi-component magnetometers and accelerometers) and a control sub with a telemetry transmitter and receiver. The control sub coordinates the operation of the various logging instruments, steering mechanisms, and drilling motors in accordance with commands received from the surface, and it provides a stream of telemetry data to the surface as needed to communicate relevant measurements and status information. A corresponding telemetry receiver and transmitter is located on or near the drilling platform 102 to complete the telemetry link. One type of telemetry link is based on modulating the flow of drilling fluid to create pressure pulses that propagate along the drill string ("mud-pulse telemetry or MPT"), but other known telemetry techniques are suitable, such as electromagnetic and acoustic telemetry. At least some of the data obtained by the control sub may be stored in memory for later retrieval, e.g., when the BHA 116 physically returns to the surface.

A surface interface 126 serves as a hub for communicating via the telemetry link and for communicating with the various sensors and control mechanisms on the platform 102. A data processing unit (shown in FIG. 1 as a tablet computer 128) communicates with the surface interface 126 via a wired or wireless link 130, collecting and processing measurement data to generate logs and other visual representations of the acquired data and the derived models to facilitate analysis by a user. The data processing unit may take many suitable forms, including one or more of: an embedded processor, a desktop computer, a laptop computer, a central processing facility, and a virtual computer in the cloud. In each case, software on a non-transitory information storage medium may configure the processing unit to carry out the desired processing, modeling, and display generation. The data processing unit may also contain storage to store, e.g., data received from tools in the BHA 116 via electromagnetic or acoustic telemetry or any other suitable communication technique. The scope of disclosure is not limited to these particular examples of data processing units.

Figure 2:
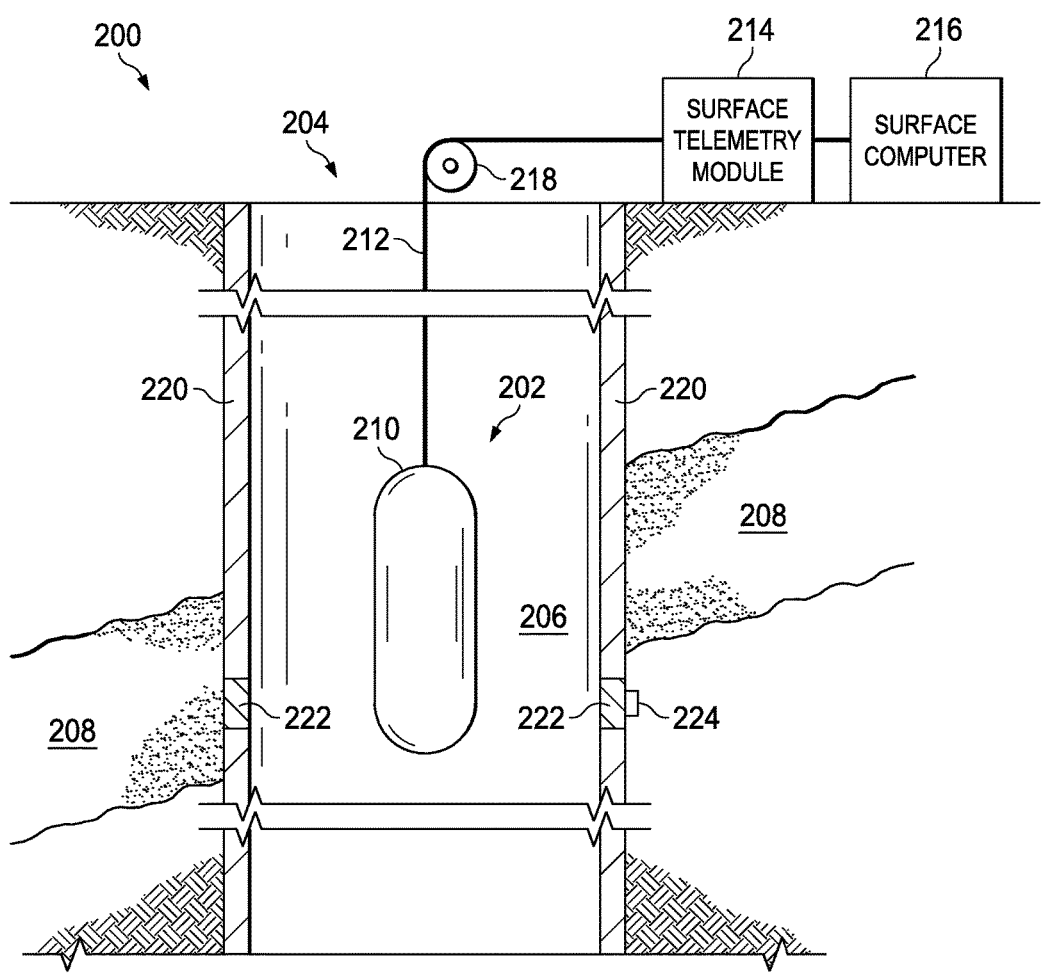
FIG. 2 is a schematic diagram of an illustrative wireline environment.

FIG. 2 is a schematic diagram of an illustrative wireline environment. More specifically, FIG. 2 illustrates a logging system 200 in accordance with at least some embodiments. Logging system 200 comprises a wireline logging tool 202 disposed within a borehole 204 proximate to a formation 208 of interest. The borehole 204 contains a casing string 220 and casing fluid 206, which may comprise one or more of oil, gas, fresh water, saline water, or other substances. The tool 202 comprises a sonde 210 within which various subsystems of the tool 202 reside, and in the illustrative case of FIG. 2 the sonde 210 is suspended within the borehole 204 by a cable 212. Cable 212, in some embodiments a multi-conductor armored cable, not only provides support for the sonde 210, but also in these embodiments communicatively couples the tool 202 to a surface telemetry module 214 and a surface computer 216. The tool 202 may be raised and lowered within the borehole 204 by way of the cable 212, and the depth of the tool 202 within the borehole 204 may be determined by depth measurement system 218 (illustrated as a depth wheel). The casing string 220 may be composed of multiple segments of casing that are joined using casing collars, such as collar 222. In some embodiments, tools (e.g., electrodes, logging equipment, communication equipment including fiber optics and transmitters and/or receivers) may be included within, coupled to or adjacent to the casing string 220 and/or the collar 222. For example, FIG. 2 includes a transceiver 224 that functions as a transmitter, receiver or both and communicates with other transmitters or receivers in other parts of the borehole 204, within the sonde 210 or at the surface.

Figure 3:
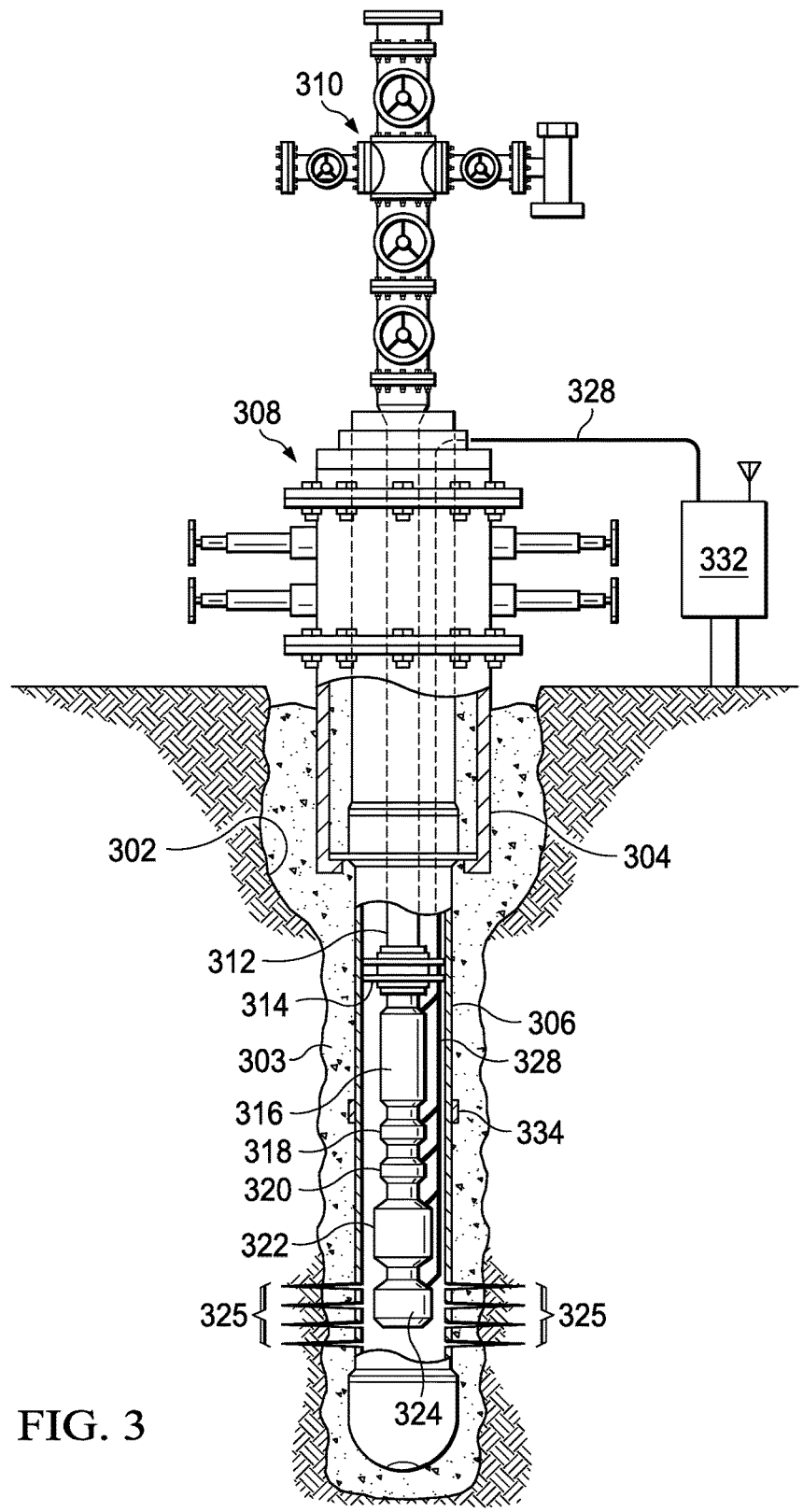
FIG. 3 is a schematic diagram of a producing well.

FIG. 3 is a schematic diagram of a producing well with a borehole 302 that has been drilled into the earth. Such boreholes, examples of which are described above with respect to FIGS. 1 and 2, are routinely drilled to ten thousand feet or more in depth and can be steered horizontally for twice that distance. The producing well includes a casing header 304 and casing 306, both secured into place by cement 303. Blowout preventer (BOP) 308 couples to casing header 306 and production wellhead 310, which together seal in the well head and enable fluids to be extracted from the well in a safe and controlled manner.

The use of measurement devices permanently installed in the well facilitates monitoring the well. The different transducers send signals to the surface that may be stored, evaluated and used to monitor the well's operations. Such signals may be transmitted using, e.g., a transmitter 334 that couples to or is disposed within the casing 306 or a casing of the collar 306. Such a transmitter may communicate with a receiver in any part of the system shown in FIG. 3, such as a receiver disposed in another part of the casing 306, within a different casing collar, within the well, or at the surface. Measured near-wellbore measurements are periodically taken at the producing well and combined with measurements from other wells within a reservoir, enabling the overall state of the reservoir to be monitored, simulated and assessed. These measurements may be taken using a number of different downhole and surface instruments, including, but not limited to, temperature and pressure sensor 318 and flow meter 320. Additional devices also coupled in-line along production tubing 312 include downhole choke 316 (used to vary the fluid flow restriction), electric submersible pump (ESP) 322 (which draws in fluid flowing from perforations 325 outside ESP 322 and production tubing 312), ESP motor 324 (driving ESP 322), and packer 314 (isolating the production zone below the packer from the rest of the well). Additional surface measurement devices may be used to measure, for example, the tubing head pressure and the electrical power consumption of ESP motor 324. Although the example of FIG. 3 shows a well that incorporates an ESP, the disclosed systems and methods may also be used with wells that incorporate other systems for assisting with the extraction of fluids (e.g., gas lift systems), or with wells without such assist systems that rely on the pressure already present in the formation and/or induced by the injector wells.

Each of the devices along production tubing 312 couples to cable 328, which is attached to the exterior of production tubing 312 and is run to the surface through blowout preventer 308 where it couples to control panel 332. Cable 328 provides power to the devices to which it couples, and further provides signal paths (electrical, optical, etc.,) that enable control signals to be directed from the surface to the downhole devices, and for telemetry signals to be received at the surface from the downhole devices. The devices may be controlled and monitored locally by field personnel using a user interface built into control panel 332, or may be controlled and monitored by a computer system (not specifically shown). Communication between control panel 332 and such a computer system may be via a wireless network (e.g., a cellular network), via a cabled network (e.g., a cabled connection to the Internet), or a combination of wireless and cabled networks.

Figure 4A:
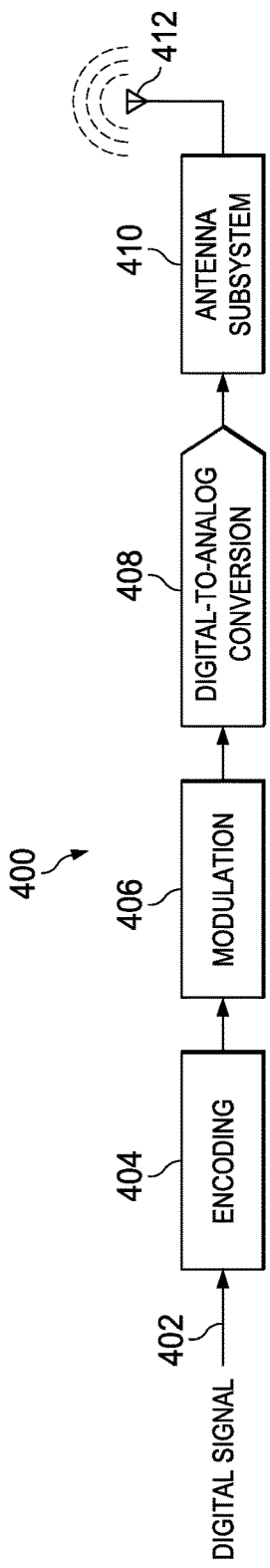
FIGS. 4A-4B are block diagrams of transmitter and receiver components, respectively.
Figure 4B:
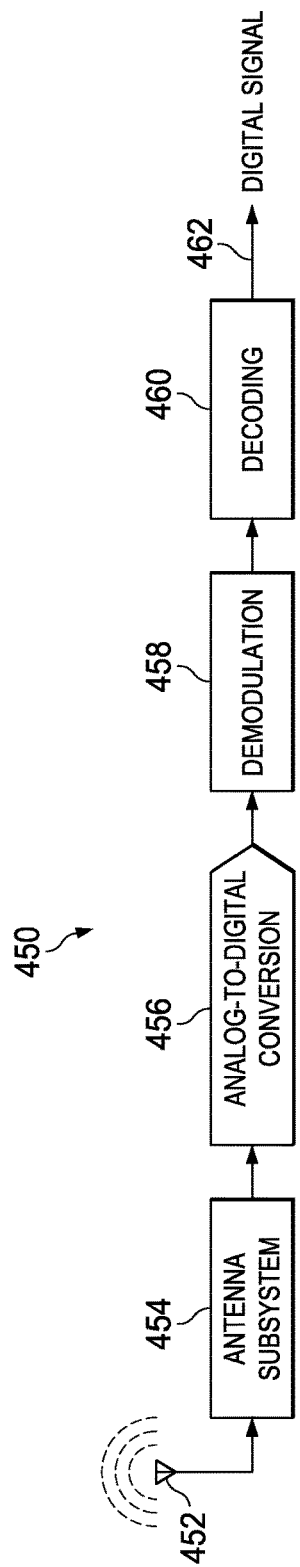

FIGS. 4A-4B are block diagrams of transmitter and receiver components, respectively. Transmitters and receivers housing the components shown in FIGS. 4A-4B may be disposed in any suitable location within any of the applications shown in FIGS. 1-3, including drilling environments, wireline environments and production environments, as well as any other suitable environment (e.g., well testing). Such locations may include, without limitation, tools or equipment within the well, the casing, a casing collar, a cement sheath adjacent to the casing, tubing, a tubing collar, the formation adjacent to the cement sheath, a different well or any locations within or adjacent to such a different well, and the surface. The scope of disclosure is not limited to any of these specific locations. FIG. 4A shows components of a transmitter 400, including encoding logic 404, modulation logic 406, digital-to-analog conversion (DAC) logic 408, an antenna subsystem 410 (including, e.g., appropriate filters, mixers, amplifiers) and an antenna 412. In operation, the digital signal 402 that is to be encoded is provided to the encoding logic 404. The encoding logic 404 encodes the digital signal using one or more of the frequency sweeping techniques described herein, and the encoded signal is provided to the modulation logic 406. The modulation logic 406 modulates the signal and, after being converted by DAC logic 408 and being suitably modified (e.g., filtered, mixed, amplified) by antenna subsystem 410, the signal is transmitted via the antenna 412. FIG. 4B shows components of a receiver 450, including antenna 452, antenna subsystem 454 (including, e.g., appropriate filters and mixers), analog-to-digital conversion (ADC) logic 456, demodulation logic 458, and decoding logic 460. In operation, the antenna 452 receives a signal that has been encoded using the frequency sweeping techniques described herein. The signal is processed by the antenna subsystem 454, the ADC 456, demodulation logic 458 and decoding logic 460 (as described in further detail below) to produce the original digital signal 462.

Figure 5:
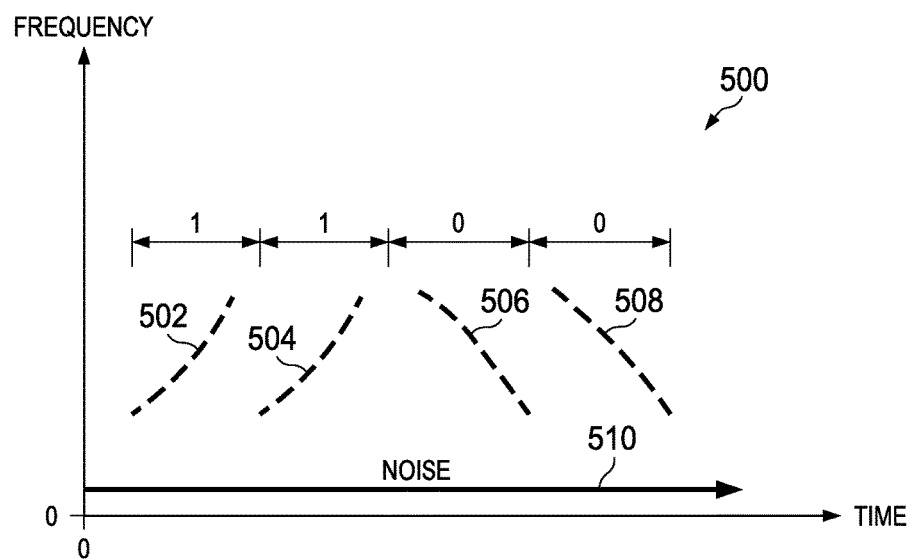
FIG. 5 is a spectrogram illustrating one manner in which frequency sweeps may be used to encode a digital signal.

FIG. 5 is a spectrogram 500 illustrating one manner in which frequency sweeps may be used to encode a digital signal. Specifically, the spectrogram 500 shows frequency sweeps that are used to encode the binary series "1," "1," "0," and "0" based on the direction parameter (in which the direction of the sweep represents a particular digital value).

As shown, an upsweep—such as upsweeps 502 and 504—encode binary "1" values, while downsweeps—such as downsweeps 506 and 508—encode binary "0" values. (The spectrogram 500 also includes low-frequency noise 510.) In the embodiment of FIG. 5, only the direction of the frequency sweeps 502, 504, 506, 508 are used to encode and decode the corresponding binary values. Thus, even if the signal drops (i.e., is non-existent) at certain frequencies within each sweep, the receiver is still able to decode the received frequency sweep signals as long as the receiver can determine whether the sweep is an upsweep or a downsweep. In some embodiments employing the direction parameter, the values of the frequencies are of lesser or no importance; only the direction of the sweep is used to decode the signal.

Figure 6:
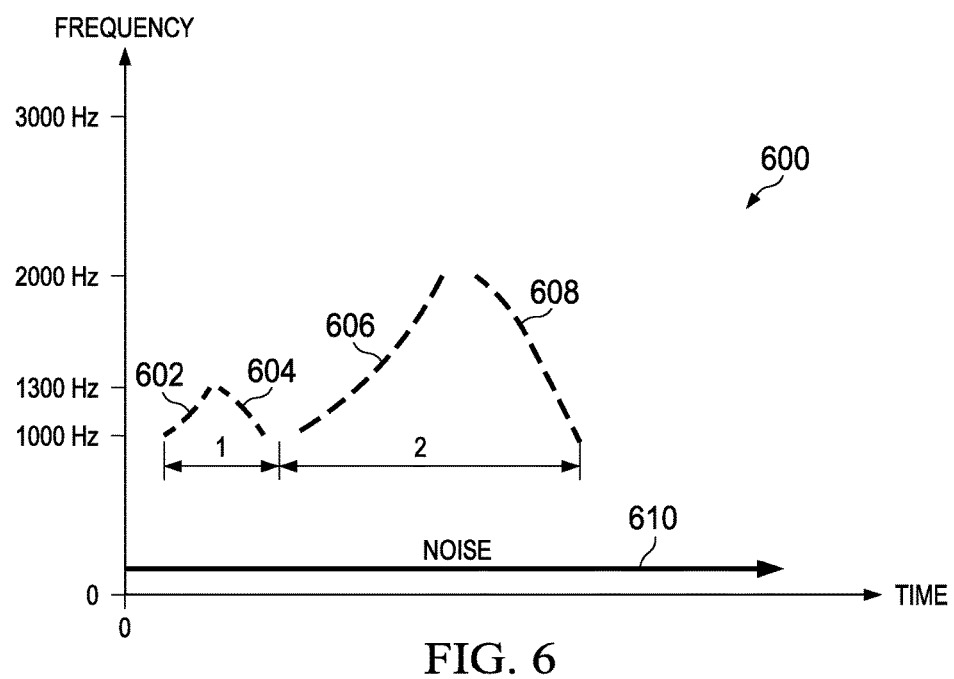
FIG. 6 is another spectrogram illustrating another manner in which frequency sweeps may be used to encode a digital signal.

FIG. 6 is a spectrogram 600 illustrating another manner in which frequency sweeps may be used to encode a digital signal. As with the spectrogram 500, the spectrogram 600 includes time on the x-axis and frequency on the y-axis. While the spectrogram 500 included sweeps that encoded digital signals based on direction, the spectrogram 600 includes sweeps that encode digital signals based on range. In spectrogram 600, a frequency sweep 602 transitions from 1000 Hz to 1300 Hz and sweep 604 transitions from 1300 Hz to 1000 Hz. The two frequency sweeps 602, 604 together encode a digital "1" (e.g., in decimal or hexadecimal format). The spectrogram 600 also includes frequency sweep 606, which transitions from 1000 Hz to 2000 Hz, and frequency sweep 608, which transitions from 2000 Hz to 1000 Hz. The sweeps 606, 608 together encode a digital "2" (e.g., in decimal or hexadecimal format). Generally, characteristics (e.g., speed) of the sweeps other than range are irrelevant as long as the transmitter and receiver have been programmed to encode and decode signals based on range only. In at least some embodiments, however, the up-and-down sweeps 602, 604 take the same amount of time as the up-and-down sweeps 606, 608, thereby maintaining a constant data rate. The sweep signals may be accompanied by a low frequency noise 610.

Figure 7:
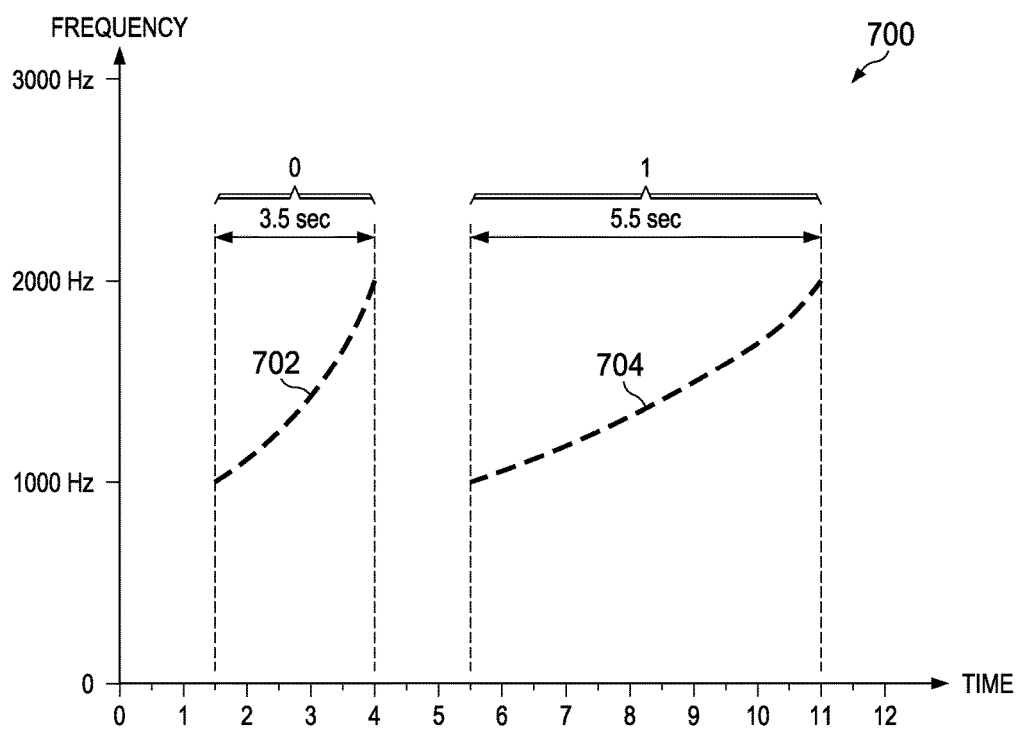
FIG. 7 is another spectrogram illustrating yet another manner in which frequency sweeps may be used to encode a digital signal.

FIG. 7 is a spectrogram 700 illustrating yet another manner in which frequency sweeps may be used to encode a digital signal. As with spectrograms 500 and 600, the spectrogram 700 includes time on the x-axis and frequency on the y-axis. While the spectrogram 500 includes direction-based sweeps and spectrogram 600 included range-based sweeps, the spectrogram 700 includes speed-based sweeps. In spectrogram 700, a frequency sweep 702 transitions from 1000 Hz to 2000 Hz over a period of 3.5 seconds, while a frequency sweep 704 transitions from 1000 Hz to 2000 Hz over a period of 5.5 seconds. Thus, although both sweeps 702, 704 transition from the same starting frequency to the same ending frequency and have the same minimum and maximum frequencies, the sweep 702 is faster than the sweep 704. Accordingly, the faster sweep 702 may be encoded as a "0" and the slower sweep 704 may be encoded as a "1." In some embodiments, different sweep speeds may be used to encode different numbers within a particular base. For example, for a base 16 number set, a total of 16 different sweep speeds may be used, one for each number in the base 16 number set.

FIGS. 5-7 are provided to demonstrate three illustrative techniques that may be used to encode digital signals using frequency sweeps. Many more frequency sweep encoding techniques are contemplated, including—without limitation—direction-based sweeps, range-based sweeps (based on both starting and ending frequencies and on minimum and maximum frequencies), speed-based sweeps and differential sweeps, all of which are described above. Although spectrograms or other types of graphs are not included to demonstrate each possible frequency sweeping technique, all such techniques and any and all variations on such techniques are included within the scope of the disclosure. For example, any of the frequency sweeping techniques described thus far may be combined so that multiple parameters are used to represent a single digital value. Both speed and range parameters, for instance, may be used to represent a single digital value, such that only a frequency sweep signal having both a particular range and a particular speed is decoded to be that single digital value. Furthermore, a particular frequency sweep need not represent a single numerical value. For example, a specific frequency sweep may represent a block of digital values, such as "00101011." In yet other embodiments, the time period between a pair of sweeps is used to encode the digital value. A delay of one second between a pair of upsweeps, for example, may encode a digital "0," while a delay of two seconds between a pair of upsweeps may encode a digital "1." In general, the encoding and decoding process is performed in any suitable manner as long as the transmitter and receiver both possess data cross-referencing each frequency sweep (including the particular parameter being used, such as speed, range, direction, or differential) with a particular digital value.

The foregoing frequency sweep encoding techniques may be manipulated to increase the transmission data rate. For instance, in some embodiments, a digital signal may be divided into two or more packets and each of the packets may be transmitted simultaneously using any of the frequency sweep encoding techniques described above. For example, the first of two packets may be transmitted using a slow upsweep and, at the same time, the second of the two packets may be transmitted using a faster upsweep. In this way, the total amount of time required to transmit both packets will be less than the amount of time that would have been required prior to dividing the signal into multiple packets. Similarly, multiple packets may be simultaneously transmitted with each packet being encoded using different frequency sweep ranges. As long as the receiver is able to receive, distinguish and decode each frequency sweep used to encode simultaneously transmitted packets, any of the foregoing techniques may be used to simultaneously transmit such packets. In some embodiments, a full duplex communication system may be employed in which separate transmitters (e.g., in different tools) simultaneously transmit signals using different sweep encoding techniques. Thus, for example, a first transmitter in a tool may transmit a signal to a first receiver using a first sweep frequency range, and, at the same time, a second transmitter in another tool may transmit a different signal to a second receiver using a second sweep frequency range. The decoding of frequency sweep signals is now described.

As explained above, a receiver may be disposed in any location described in the applications of FIGS. 1-3 or in any other suitable location. The receiver contains the information necessary to decode the frequency sweep signals—that is, both the transmitter and receiver use predetermined frequency sweep encoding schemes to encode and decode signals. In some embodiments, the receiver receives a particular frequency sweep and determines the sweep's parameters. Based on the parameters, the receiver decodes the sweep. For example, in a direction-based sweep scheme, the receiver determines that the received sweep is an upsweep and interprets that upsweep as a "0," a "1," or as may be appropriate. In some embodiments, a spectrogram—such as those shown in FIGS. 5-7—may be used to visualize the received sweep and to compare the received sweep to a reference upsweep or downsweep signal using a known convolution or cross-correlation technique (e.g., as described in "Techniques for Studying Vocal Learning in Bottlenose Dolphins, *Tursiops Truncatus*," by Deborah Fripp (Massachusetts Institute of Technology, 1999)).

Figure 8A:
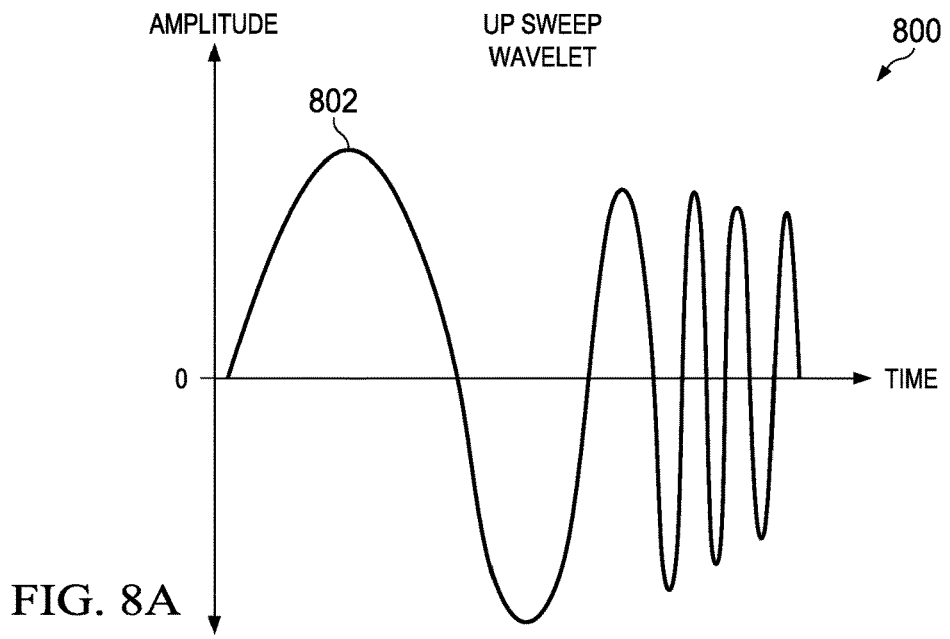
FIGS. 8A-8B are illustrative upsweep and downsweep wavelet graphs, respectively, that are usable to decode received frequency sweep signals.
Figure 8B:
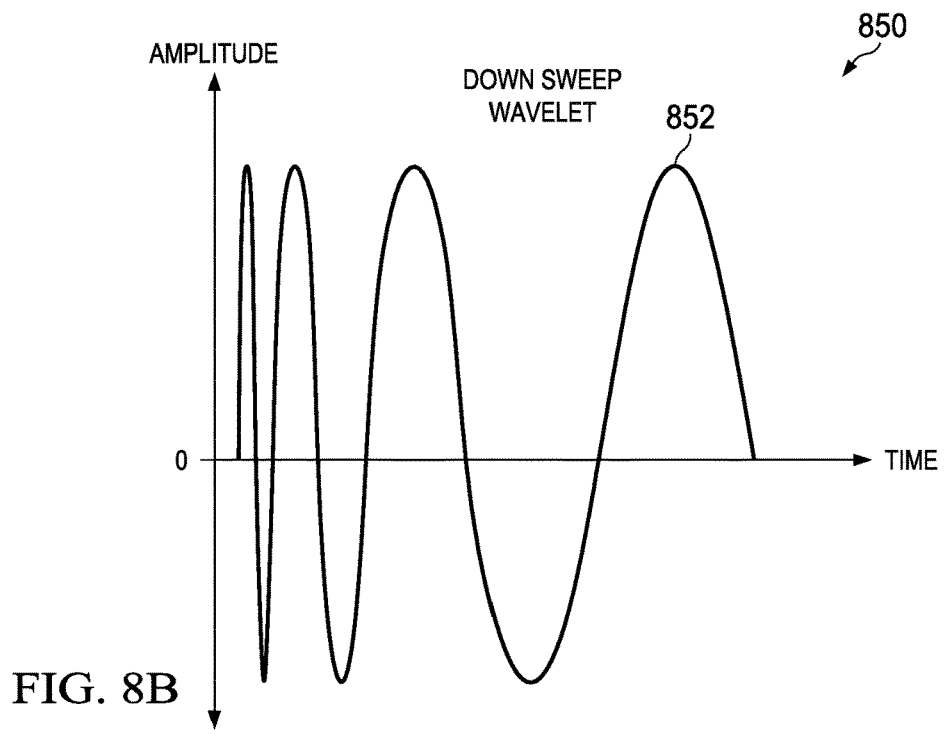

Wavelet analysis is another technique for decoding received frequency sweep signals. In wavelet analysis, the receiver compares the received frequency sweep signal to a sample wavelet. Separate upsweep and downsweep wavelets are used to decode the digital values, and FIGS. 8A-8B provide illustrative upsweep and downsweep wavelet graphs, respectively. Referring to FIG. 8A, the graph 800 includes a wavelet 802 that has a constant-amplitude signal that increases in frequency, thus representing an upsweep wavelet. Conversely, in FIG. 8B, the graph 850 includes a wavelet 852 that has a constant-amplitude signal that decreases in frequency, thus representing a downsweep wavelet. Such reference wavelets may be compared to received frequency sweeps to determine whether the received sweep is an upsweep or a downsweep. The upsweep or downsweep is then decoded into a digital signal based on the predetermined encoding scheme that has been programmed into the transmitter and receiver. The foregoing decoding techniques may be performed in either the time or frequency domains, although, as is well-known, decoding in the frequency domain may reduce sensitivity to noise. Other decoding techniques, including any and all variations on the foregoing techniques, are contemplated and included within the scope of the disclosure. For example and without limitation, in a direction-based frequency sweep encoding scheme, merely determining whether the received frequency sweep is increasing or decreasing in frequency may, in some cases, be sufficient to resolve the received sweep into its digital value.

Figure 9:
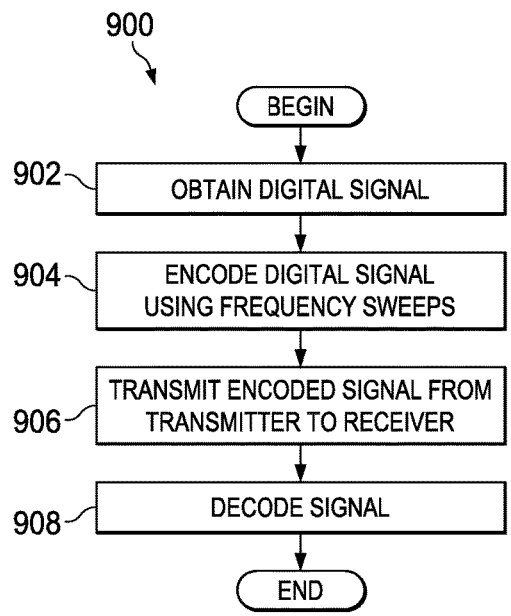
FIG. 9 is a flow diagram of a method for using frequency sweeps to transmit and receive digital signals.

FIG. 9 is a flow diagram of a method 900 for using frequency sweeps to transmit and receive digital signals. The method 900 begins by obtaining a digital signal to be encoded (step 902). The method 900 next includes encoding the digital signal using one or more frequency sweeps (step 904). The number of ways in which the digital signal may be encoded using frequency sweeps is expansive. At least some of these frequency sweep encoding techniques are explicitly described above, including direction-, range-, speed- and differential-based techniques. These may be used both in single-packet transmission applications and simultaneous, multi-packet transmission applications. The scope of disclosure, however, is not limited to the specific techniques described herein, and all variations on these techniques are contemplated. The method 900 then includes transmitting the encoded signal from the transmitter to the receiver (step 906). As explained, the transmitter and receiver are deployed in an oil and gas application, and at least one of the transmitter and receiver is deployed downhole (e.g., in a downhole tool or drill string; in cement casing or a cement sheath circumscribing a cement casing; in or coupled to a casing collar). The method 900 concludes with decoding the received frequency sweep signal using any suitable technique, such as one of the decoding techniques specifically described herein.

Numerous other variations and modifications will become apparent to those skilled in the art once the above disclosure is fully appreciated. It is intended that the following claims be interpreted to embrace all such variations, modifications and equivalents. In addition, the term "or" should be interpreted in an inclusive sense.

The present disclosure encompasses numerous embodiments. At least some of the embodiments are directed to method for encoding signals using frequency sweeps in a downhole environment, comprising: obtaining a digital signal; encoding the digital signal using one or more frequency sweeps to produce an encoded signal; transmitting the encoded signal from a transmitter to a receiver, at least one of the transmitter or receiver disposed downhole; receiving the encoded signal at the receiver; and decoding the encoded signal at the receiver to produce a decoded digital signal. Such embodiments may be supplemented in a variety of ways, including by adding any of the following concepts or steps in any sequence and in any combination: wherein using said one or more frequency sweeps comprises using an upsweep from a first frequency to a second frequency to indicate a digital value; wherein using said one or more frequency sweeps comprises using a downsweep from a first frequency to a second frequency to indicate a digital value; wherein using said one or more frequency sweeps comprises using an upsweep from a first frequency to a second frequency and a downsweep from a third frequency to a fourth frequency to indicate a digital value; wherein the first frequency is equivalent to the fourth frequency and the second frequency is equivalent to the third frequency; wherein using said one or more frequency sweeps comprises using a first upsweep and a first downsweep to indicate a first digital value, and using a second upsweep and a second downsweep to indicate a second digital value, and wherein a first time used to perform the first upsweep and first downsweep is equivalent to a second time used to perform the second upsweep and the second downsweep; wherein using said one or more frequency sweeps comprises using an upsweep from a first frequency to a second frequency to indicate a first digital value and using a downsweep from a third frequency to a fourth frequency to indicate a second digital value; wherein said first and fourth frequencies are equivalent, and wherein the second and third frequencies are equivalent; further comprising using an upsweep from the first frequency to a different frequency to indicate a fifth digital value; wherein using said one or more frequency sweeps comprises setting a speed of an upsweep or a downsweep to indicate a digital value; wherein encoding the digital signal using one or more frequency sweeps comprises setting a time interval between two frequency sweeps to represent the digital signal; wherein said one or more frequency sweeps are at a first speed, and further comprising encoding a second digital signal using said one or more frequency sweeps at a second speed to produce a second encoded signal, and further comprising simultaneously transmitting the encoded signal and the second encoded signal; wherein decoding the encoded signal comprises comparing the encoded signal to a reference upsweep wavelet or a reference downsweep wavelet.

At least some embodiments are directed to a method for encoding digital data in a downhole environment, comprising: obtaining said digital data comprising a series of digital values; setting at least one of a direction, a speed or a range of a frequency sweep signal to encode one or more of the digital values from said series; and transmitting the frequency sweep signal from a transmitter to a receiver, at least one of the transmitter or receiver disposed downhole. Such embodiments may be supplemented in a variety of ways, including by adding any of the following concepts or steps in any sequence and in any combination: further comprising setting at least two of said direction, said speed or said range of the frequency sweep signal to encode the one or more of the digital values from said series; wherein a difference between two values in the range of the frequency sweep signal is set to encode said one or more of the digital values from the series; wherein said two values in the range of the frequency sweep signal are selected from the group consisting of: a minimum frequency value in said range and a maximum frequency value in said range, and a starting frequency in said range and an ending frequency in said range; further comprising decoding the frequency sweep signal using a spectrogram; wherein at least one of the transmitter or receiver are disposed within a drill string in a wellbore; wherein at least one of the transmitter or receiver are disposed within a casing of a producing well or are coupled to a collar of said casing of the producing well.

What is claimed is:

1. A method for encoding signals using frequency sweeps in a downhole environment, comprising:
    obtaining a digital signal;
    encoding the digital signal using one or more frequency sweeps to produce an encoded signal;
    transmitting the encoded signal from a transmitter to a receiver, at least one of the transmitter or receiver disposed downhole;
    receiving the encoded signal at the receiver; and
    decoding the encoded signal at the receiver to produce a decoded digital signal.

2. The method of claim 1, wherein using said one or more frequency sweeps comprises using an upsweep from a first frequency to a second frequency to indicate a digital value.

3. The method of claim 1, wherein using said one or more frequency sweeps comprises using a downsweep from a first frequency to a second frequency to indicate a digital value.

4. The method of claim 1, wherein using said one or more frequency sweeps comprises using an upsweep from a first frequency to a second frequency and a downsweep from a third frequency to a fourth frequency to indicate a digital value.

5. The method of claim 4, wherein the first frequency is equivalent to the fourth frequency and the second frequency is equivalent to the third frequency.

6. The method of claim 1, wherein using said one or more frequency sweeps comprises using a first upsweep and a first downsweep to indicate a first digital value, and using a second upsweep and a second downsweep to indicate a second digital value, and wherein a first time used to perform the first upsweep and first downsweep is equivalent to a second time used to perform the second upsweep and the second downsweep.

7. The method of claim 1, wherein using said one or more frequency sweeps comprises using an upsweep from a first frequency to a second frequency to indicate a first digital value and using a downsweep from a third frequency to a fourth frequency to indicate a second digital value.

8. The method of claim 7, wherein said first and fourth frequencies are equivalent, and wherein the second and third frequencies are equivalent.

9. The method of claim 7, further comprising using an upsweep from the first frequency to a different frequency to indicate a fifth digital value.

10. The method of claim 1, wherein using said one or more frequency sweeps comprises setting a speed of an upsweep or a downsweep to indicate a digital value.

11. The method of claim 1, wherein encoding the digital signal using one or more frequency sweeps comprises setting a time interval between two frequency sweeps to represent the digital signal.

12. The method of claim 1, wherein said one or more frequency sweeps are at a first speed, and further comprising encoding a second digital signal using said one or more frequency sweeps at a second speed to produce a second encoded signal, and further comprising simultaneously transmitting the encoded signal and the second encoded signal.

13. The method of claim 1, wherein decoding the encoded signal comprises comparing the encoded signal to a reference upsweep wavelet or a reference downsweep wavelet.

14. A method for encoding digital data in a downhole environment, comprising:
   obtaining said digital data comprising a series of digital values;
   setting at least one of a direction, a speed or a range of a frequency sweep signal to encode one or more of the digital values from said series; and
   transmitting the frequency sweep signal from a transmitter to a receiver, at least one of the transmitter or receiver disposed downhole.

15. The method of claim 14, further comprising setting at least two of said direction, said speed or said range of the frequency sweep signal to encode the one or more of the digital values from said series.

16. The method of claim 14, wherein a difference between two values in the range of the frequency sweep signal is set to encode said one or more of the digital values from the series.

17. The method of claim 16, wherein said two values in the range of the frequency sweep signal are selected from the group consisting of:
   a minimum frequency value in said range and a maximum frequency value in said range; and
   a starting frequency in said range and an ending frequency in said range.

18. The method of claim 14, further comprising decoding the frequency sweep signal using a spectrogram.

19. The method of claim 14, wherein at least one of the transmitter or receiver are disposed within a drill string in a wellbore.

20. The method of claim 14, wherein at least one of the transmitter or receiver are disposed within a casing of a producing well or are coupled to a collar of said casing of the producing well.

* * * * *